(12) United States Patent
Schram et al.

(10) Patent No.: US 9,134,528 B2
(45) Date of Patent: Sep. 15, 2015

(54) METHOD OF MANUFACTURING AN OPTICAL DISPLAY

(75) Inventors: Ivar Schram, Weert (NL); Romaric Massard, Eindhoven (NL); Christophe Miremont, West Lothian (GB)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 13/298,516

(22) Filed: Nov. 17, 2011

(65) Prior Publication Data

US 2012/0127555 A1    May 24, 2012

Related U.S. Application Data

(63) Continuation of application No. PCT/EP2010/057010, filed on May 20, 2010.

(30) Foreign Application Priority Data

May 20, 2009    (GB) .................... 0908681.0

(51) Int. Cl.
*G02B 26/00* (2006.01)
*G02B 26/02* (2006.01)

(52) U.S. Cl.
CPC ............. *G02B 26/005* (2013.01); *G02B 26/02* (2013.01); *Y10T 137/0318* (2013.01); *Y10T 137/8593* (2013.01)

(58) Field of Classification Search
CPC .. G02B 26/005; G02B 26/026; G02B 26/004; G02B 26/02; G03F 7/70341
USPC .................. 359/265–275, 290–295
See application file for complete search history.

(56) References Cited

U.S. PATENT DOCUMENTS

| | | | |
|---|---|---|---|
| 6,919,003 B2 * | 7/2005 | Ikeda et al. | 204/490 |
| 7,847,996 B2 | 12/2010 | Chen et al. | |
| 7,864,439 B1 * | 1/2011 | Hickerson | 359/666 |
| 2005/0025981 A1 * | 2/2005 | Getz | 428/426 |

(Continued)

FOREIGN PATENT DOCUMENTS

| | | |
|---|---|---|
| CN | 101128767 A | 2/2008 |
| CN | 101355838 A | 1/2009 |
| CN | 101359091 A | 9/2010 |

OTHER PUBLICATIONS

Sun, B., et al: "Scalable fabrication of electrowetting displays with self-assembled oil dosing," Applied Physics Letters, AIP, American Institute of Physics, Melville, NY, US LNKD-DOI: 10.1063/1.2753697. vol. 91, No. 1, Jul. 2, 2007, pp. 11106-11106, XP012098922, ISSN: 0003-6951.
Heikenfeld, J.C., et al: "Flat Electrowetting Optics and Displays," Proceedings of SPIE, MOEMS and Miniaturized Systems VII, 2008, pp. 688705-1-688705-7, XP040433884, PO Box 10, Bellingham, WA 98227-0010 USA.

(Continued)

*Primary Examiner* — Ricky Mack
*Assistant Examiner* — Daniele Manikeu
(74) *Attorney, Agent, or Firm* — BainwoodHuang (57) ABSTRACT

A method for manufacturing an electrowetting device provides a first fluid on a surface of a substrate. The method includes the steps of immersing part of the substrate in a second fluid, the second fluid being immiscible with the first fluid, and a surface of the second fluid forming a gutter along the surface of the substrate; providing a quantity of the first fluid in the gutter; and moving the gutter along the surface of the substrate, the surface of the substrate and a horizontal plane forming an angle between 100 degrees and 170 degrees. Also disclosed is an apparatus for performing the method.

22 Claims, 5 Drawing Sheets

(56) References Cited

U.S. PATENT DOCUMENTS

| | | |
|---|---|---|
| 2008/0204370 A1 | 8/2008 | Feenstra et al. |
| 2008/0212161 A1* | 9/2008 | Valette et al. .................. 359/291 |
| 2009/0040591 A1 | 2/2009 | Cheng et al. |
| 2011/0194168 A1* | 8/2011 | Slack et al. ................... 359/290 |

OTHER PUBLICATIONS

Lao, Y., et al: "Ultra-High Transmission Electrowetting Displays Enabled by Integrated Reflectors," Journal of Display Technology, IEEE Service Center, New York, NY, US, vol. 4, No. 2, Jun. 1, 2008, pp. 120-122, XP011206218, ISSN: 1551-319X.

* cited by examiner

METHOD OF MANUFACTURING AN OPTICAL DISPLAY

FIELD OF THE INVENTION

The present invention relates to a method of manufacturing an optical display, particularly an electrowetting display.

BACKGROUND OF THE INVENTION

The article 'Scalable fabrication of electrowetting displays with self-assembled oil dosing' by B. Sun et al, Applied Physics Letters 91, 011106 (2007) discloses a method of providing an oil layer on a surface of a substrate, more in particular a process for filling pixel areas of a display substrate with oil. A substrate provided with walls of hydrophilic material in a grid pattern and hydrophobic pixel areas between the walls is lowered vertically into a container in which a layer of oil floats upon water. Upon lowering the substrate, the oil first wets both the walls and pixel areas. As the substrate is further lowered, the water wets the top surface of the hydrophilic walls, thereby removing the oil from it. At the same time, the oil remains wetted to the pixel areas. After the filling process, the pixel areas are filled with oil to the top of the walls.

A disadvantage of the known method of filling oil on a substrate is the relatively large quantity of oil required in the method.

It is an object of the invention to provide a method that requires less oil.

SUMMARY OF THE INVENTION

In accordance with one aspect of the present invention, there is provided a method of providing a first fluid on a surface of a substrate for manufacturing an electrowetting device, the method including the steps of immersing part of the substrate in a second fluid, the second fluid being immiscible with the first fluid, and a surface of the second fluid forming a gutter along the surface of the substrate;

providing a quantity of the first fluid in the gutter; and moving the gutter along the surface of the substrate, the surface of the substrate and a horizontal plane forming an angle between 100 degrees and 170 degrees.

On lowering a substrate into the second fluid, the surface of the second fluid shows a depression adjacent the substrate when the surface tension of the second fluid is relatively large and the wettability of the surface of the substrate for the second fluid is relatively low.

This depression may form a gutter in the surface of the second fluid depending on the surface tension of the second fluid and the wettability of the surface of the substrate for the second fluid. A lower wettability results in a deeper gutter. The first fluid floats on the second fluid, and therefore any first fluid not coating the substrate floats on the second fluid, including in the gutter.

Prior art systems, such as that described above, include lowering a substrate for coating in a fluid bath, with a relatively thick layer of coating fluid floating on the surface of a second fluid. The substrate is lowered in only a small portion of the fluids provided, meaning that much of the coating fluid is wasted, or may require purification before re-use. Further, with a large surface area of the coating fluid exposed to the atmosphere, evaporation of any solvent of the coating fluid may degrade the coating fluid rapidly, by for example causing flocculation. Further, for applying the oil to the substrate, the floating oil film thickness is relatively thick, being greater than several pixel sizes of the substrate.

The inventors of the present invention have realised that by providing the surface of the substrate at an angle of between 100 and 170 degrees from a horizontal plane, a significantly smaller amount of first fluid is needed to immerse the desired area of the substrate, such as two pixel areas. As well as reducing costs, since less oil is required, this may also reduce evaporation of any solvent. In contrast, the prior art requires a significantly larger quantity of coating fluid to achieve the same extent of immersion of greater than several pixel sizes; this is because the substrate is vertically lowered into the coating fluid.

With a reduced quantity of first fluid compared with the prior art, the present invention can provide a layer of the first fluid on the substrate surface with a uniform thickness, allowing high quality optical displays to be made. In embodiments of the invention, a portion of the first fluid may also lie outside the confinement of the gutter, forming a thin layer on the surface of the second fluid. This thin layer is significantly thinner than the oil layer of the prior art.

Thus, the method of the present invention is cost-effective and efficient.

In an embodiment of the invention, the first fluid floats on the second fluid and is substantially confined to the gutter. In this embodiment, any of the first fluid not coating the surface of the substrate is floating on the second fluid and is substantially confined to the gutter.

The first fluid may be expensive. The present invention minimises wastage of the first fluid during application to the substrate surface, since a small quantity of first fluid is required in the gutter. Thus, manufacturing costs of electrowetting displays are reduced. Plus, by confining the first fluid substantially to the gutter, any evaporation effects are minimised as a small surface area of the first fluid is exposed to the atmosphere. In contrast, in the prior art, the relatively thick layer of oil, which is significantly more than actually required to coat the substrate, leads to greater wastage and costs. With a small surface area, any risk of contamination of the first fluid is reduced also.

When the gutter has sufficient depth, the extent of the first fluid can be restricted to within the gutter, while still covering a sufficient area of the surface of the substrate to provide proper application of the first fluid. Since the first fluid need not form a layer on the second fluid, the quantity of first fluid required is reduced significantly. It makes it economically feasible to discard any first fluid that remains floating on the second fluid after having carried out the method of the invention, instead of reusing the first fluid in a subsequent application of the method, which may require a purification step.

In an embodiment of the invention, there is provided a method including the steps of arranging the substrate in a container; and providing the second fluid into the container, thereby moving the gutter along the surface of the substrate. The gutter can be moved along the surface of the substrate in several ways. In a first way the substrate is lowered into a container filled with the second fluid. The first fluid may be present on the surface of the second fluid before the substrate dips into the first fluid. Alternatively, the first fluid may be added after a part of the substrate has been immersed in the second fluid and a gutter has been formed.

In a second way the substrate is stationary and the container including the second fluid is raised such that the substrate dips into the second fluid. The first fluid may again be present on the surface of the second fluid before the substrate dips into the first fluid or the first fluid may be added when a gutter has been formed.

In a third way, the substrate is arranged in a container when there is only a small amount of second fluid or no second fluid in the container. The level of the second fluid in the container is raised by providing the second fluid into the container in a controlled manner, thereby moving the gutter along the surface of the substrate at a constant speed. The first fluid can be provided on the surface of the second fluid before the surface of the second fluid has reached the substrate. The first fluid may be provided when a gutter has been formed, thereby reducing the amount of first fluid required.

The third way is simple and does not require mechanical movement of the substrate or container, which movement causes vibrations which may adversely affect the homogeneity of the thickness of the first fluid layer in the pixel areas.

In a further embodiment of the invention, there is provided a method including the step of arranging a plate parallel to the substrate before moving the gutter along the surface of the substrate.

The first fluid will remain in the gutter when the surface tension of the second fluid is smaller than the surface tension of the first fluid. When the surface tension of a type of second fluid is similar to that of the first fluid, the second fluid may tend to flow out of the gutter. This type of first fluid may be confined to the gutter and its surroundings if a plate is arranged parallel to the substrate on the side to be filled, before the filling process starts. The side of the plate facing the gutter forms an acute angle with the surface of the second fluid. The second fluid will creep up this surface of the plate, forming a concave surface as seen from above and taking the shape of a bank parallel to the gutter. This may be referred to below as an inverse gutter. Any first fluid flowing away from the gutter will be forced back by the inverse gutter. The formation of the inverse gutter depends on the surface tension of the second fluid and the wettability of the surface of the plate. The width of the gutter and the inverse gutter is taken horizontally and can be estimated from the so-called capillary length CL, which depends on the surface tension and density of the fluid used. The width is then defined as:

$$\text{Width} = CL + \text{depth}/\tan \alpha$$

where the depth is taken vertically and is defined as $$\text{Depth} = \sqrt{2 \times CL}$$

The distance between the plate and the substrate, measured in the horizontal plane, may be larger than the capillary length to avoid second fluid creeping up between the plate and the substrate. The distance may be approximately equal to or less than the sum of the width of the gutter and the width of the inverse gutter to make sure that the inverse gutter pushes the second fluid back into the gutter. For water type second fluids and plates of glass the depth of the gutter may be around 2 to 3 mm and the width of the gutter may be around 6 to 7 mm. As a result, a distance of 13 mm between the plate and the substrate has shown good results.

According to another embodiment of the invention, a method is provided wherein the angle between the surface of the substrate and the horizontal plane is between 135 degrees and 160 degrees. This is an example of a range of angles for forming an inverse gutter of second fluid near the plate.

In a further embodiment of the invention, the plate is a further substrate or a support plate for a substrate. This facilitates providing of first fluid on multiple substrates simultaneously.

In another embodiment of the invention, the second fluid is provided in the gutter through a hole in the plate or through a tube passing between the substrate and the plate. This provides a simple method of providing the first fluid in the gutter.

In an embodiment of the invention, the method includes the step of removing the first fluid from the surface of the second fluid after the first fluid has been provided on the surface of at least part of the substrate; and removing the substrate from the second fluid. The coated substrate may be coupled to a cover plate before removing the substrate from the second fluid. The quantity of first fluid remaining on the surface of the second fluid is relatively small when the first fluid had been confined to the gutter. This first fluid can be removed by a flow of the second fluid towards a drain, by a current of air over the surface in the direction of the drain or by a skimmer. This avoids contaminating the substrate coated with a layer of the first fluid with excess first fluid, which might otherwise disrupt the first fluid layer thickness.

According to a further embodiment of the invention, the providing of the second fluid into the container moves the gutter so as to immerse further of the substrate in the second fluid. Thus, the gutter may be moved along the substrate simply and efficiently.

According to a further aspect there is provided apparatus arranged to perform the method according to any of the preceding claims.

In an embodiment of the invention the apparatus includes a container for holding the second fluid, the container including a support for one or more substrates at an angle between 100 and 170 degrees with a horizontal plane. In a further embodiment, the support includes a holder for one or more plates for supporting the one or more substrates. This allows the one or more substrates to be provided and held in place at the desired angle for providing the first fluid on the surface correctly.

According to an embodiment, the apparatus includes a container and a system for providing the second fluid into the container at a pre-determined rate. Thus, the gutter may be moved along the substrate surface controllably, to obtain a coating of the first fluid with a particular thickness.

According to another aspect of the present invention, there is provided a method of providing a first fluid on a surface of a substrate for manufacturing an electrowetting device, the method including the steps of providing at least part of the substrate in a container for holding a quantity of a second fluid, the second fluid being immiscible with the first fluid;

providing the second fluid into the container;

providing a quantity of the first fluid on the second fluid and adjacent a surface of the substrate;

providing further of the second fluid into the container, thereby moving the quantity of first fluid along a surface of the substrate.

This method may be used to provide the first fluid on the surface of the substrate, with the surface substrate being positioned at an angle of between 90 degrees and 170 degrees. This method corresponds with the third way of moving the gutter along the surface of the substrate described above, and is simple and requires no mechanical movement of the substrate or container, which can cause vibrations which may adversely affect the homogeneity of the thickness of the first fluid layer in the pixel areas.

According to a further aspect of the invention, there is provided an electrowetting optical display manufactured using the method of the present invention.

Further features of the invention will become apparent from the following description of embodiments of the invention, given by way of example only, which is made with reference to the accompanying drawings.

DETAILED DESCRIPTION OF THE INVENTION

Figure 1:
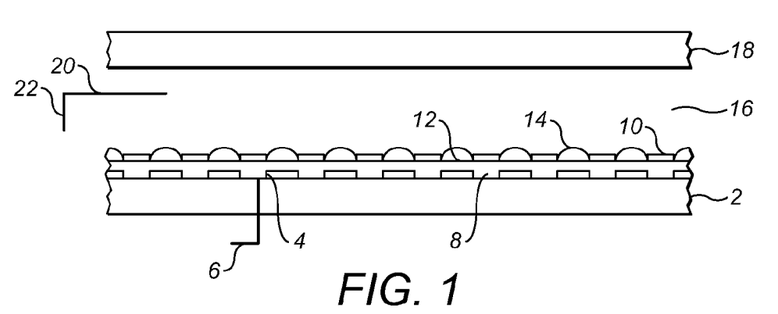
FIG. 1 shows a cross section of an electrowetting element.

FIG. 1 shows a cross-section of a series of electrowetting elements made using the method according to the invention. A first substrate 2 is provided with electrodes 4, deposited as a thin-film conductor on the substrate. Each electrode is connected to a signal line 6 for providing a voltage. The electrodes are covered by a thin hydrophobic layer 8 of the amorphous fluoropolymer AF1600. A pattern of a thin hydrophilic layer 10 of SU8 divides the surface of the substrate in hydrophobic first areas 12 between the hydrophilic second areas 10. These first areas may be referred to as pixel areas. The size of the first areas is, for instance, 160 micrometres square, the second areas can have a width of 10 micrometres and a height of 3 to 6 micrometres. The first substrate 2, provided with the layers 4, 8 and 10, is subjected to the method according to the invention using oil as first fluid, water as second fluid and air as third fluid or another combination of fluids. After carrying out the method the first areas 12 are uniformly covered by an oil layer 14 having a thickness of between 3 and 6 micrometres, for example 5 micrometres. The second areas 10 and the oil layer are covered by water 16. The water may contain salt to increase its electrical conductivity and to enlarge the temperature window for the method. The second fluid, water in this example, used during the method may be the same fluid used in the product that includes the substrate, which avoids changing the second fluid after the execution of the method by another fluid. A second substrate 18 forms a closed space between the first and second substrate. The space is protected from the environment by seals, not shown in the Figure, attached to both substrates.

The pattern of the layer 10 defines elements on the substrate to which the oil layer 14 is confined. Each element has an electrode 4. Another electrode 20, connected to a signal line 22, is in contact with the water 16, forming a common electrode for a plurality of elements. When a voltage is applied between the common electrode 20 and the electrode 4 of an element, the oil layer 14 in that element moves to the side of an element or breaks up and the first surface will at least partly be covered by the water 16. This so-called electrowetting effect is more fully described in international patent application WO03/071346. When the oil and/or the water has specific optical properties for absorption, reflection and/or transmission of light, the element can operate as a light valve in e.g. a display.

The electrowetting elements may be used in a display apparatus, in which a plurality of electrowetting elements forms a display device. A display driving system in the apparatus provides the voltages for setting the elements in the desired state.

Figure 2:
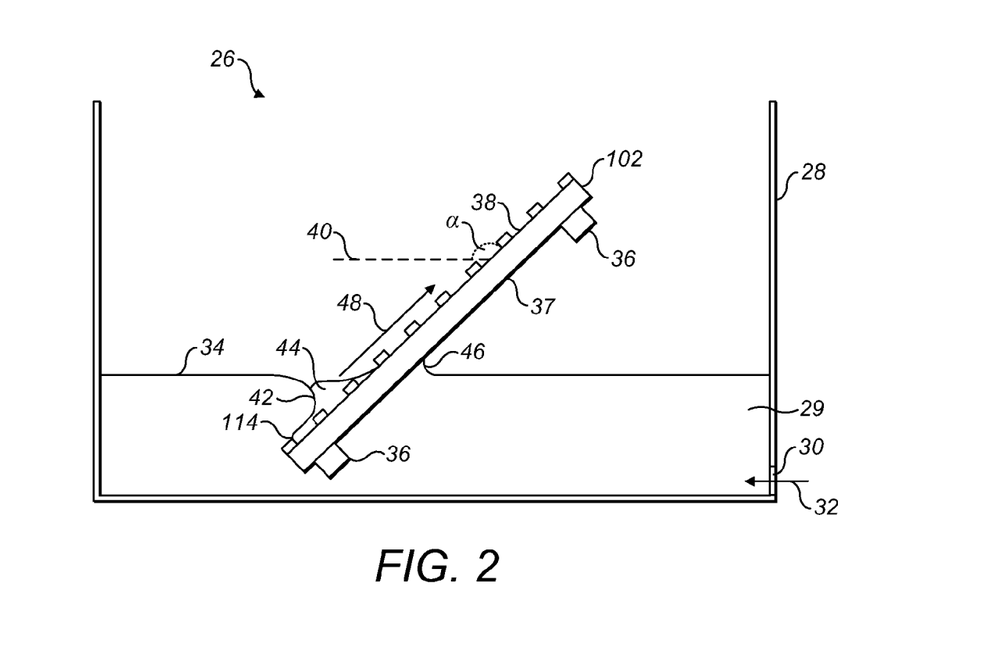
FIGS. 2, 3 and 4 show schematically apparatus at stages of a method according to an embodiment of the present invention.

FIG. 2 shows exemplary apparatus 26 in cross section for providing the method of the invention. Features described for FIG. 2 are similar to features described previously. Such features will be referred to using the same reference numerals, incremented by 100; corresponding descriptions should be taken to apply also. The apparatus 26 includes a container 28 suitable for holding a quantity of the second fluid, and for holding and immersing the first substrate. The container 28 may for example be made of a hydrophilic material, or the inside surface of the container may be hydrophilic, to reduce any adherence of the first fluid to the inside of the container, and may therefore be formed of glass. Otherwise, the inside of the container may be contaminated with the first fluid, which may detriment the quality and uniformity of the layer of first fluid applied to the first substrate and lead to unnecessary loss of first fluid. Further, the presence of glue for joining separate parts of the container together may be minimised where possible, to minimise any glue surfaces in the container which the first fluid may adhere to. The container 28 is arranged for filling with the second fluid 29. For example, in this embodiment, the container 28 has an opening 30 through which the second fluid can be provided. There is a system 32 for providing the second fluid into the container at a pre-determined rate. For example, the second fluid may be provided via a tube, arranged with a control valve for controlling the flow rate of the second fluid into the container 28. In an embodiment, the apparatus is arranged at the base of the container, so the opening 30 is beneath an upper surface 34 of the second fluid in the container. This minimises disturbance, for example by vibration, of the upper surface 34. This aids covering the first areas 12 with a uniform thickness of the first fluid, to be described later.

The apparatus 26 further includes at least one support for supporting the first substrate 102. In this embodiment, there are two supports 36 which are each mounted horizontally and in parallel with each other across the inside of the container, and are fixed to the inside of two opposing walls of the container. The supports 36 are adapted and positioned with respect to each other so the first substrate 102 can be mounted on the supports 36 with an angle (explained later) for the method of the invention. Further, the supports 36 are arranged to hold securely the first substrate 102 on the supports 36, so the first substrate is held in a fixed position during the method of the invention. Further, the supports 36 are arranged so the first substrate 102 may be easily removed from the supports after performing the method of the invention, without disrupting the layer of first fluid applied during the method. In other embodiments, at least one support may be a plate, or may include a holder for holding one or more plates, or may be otherwise configured to hold one or more of the first substrates for providing with the first fluid, for instance by having slits with a predefined angle on the bottom of the container.

In accordance with an embodiment of the present invention, the first substrate 102 is mounted on the supports 36, thus arranging the first substrate in the container. The first substrate is provided with the electrodes, the hydrophobic layer and the hydrophilic layer described previously; these are not shown in FIG. 2. The surface 37 of the first substrate which opposes the electrode covered surface, is placed in contact with the supports 36. The first substrate is mounted so that a desired angle α between the surface 38 of the first substrate covered with the electrodes and a horizontal plane 40 is between 100 and 170 degrees, and may be between 135 and 160 degrees. The configuration of the surface 34 of the second fluid which is not influenced by interaction with another surface, such as a wall of the container, lies substantially in a horizontal plane. The first substrate may be clean and free of contamination before immersing the first substrate with the first and second fluids.

With the first substrate 102 mounted on the supports 36, the container is filled with the second fluid 29 through the opening 30. The container may be empty of the second fluid when the first substrate is mounted, or there may already be a quantity of second fluid in the container. In the latter, the quantity of second fluid is such that the surface 34 is below the lowest point of the first substrate when mounted on the supports 36. The flow rate of the second fluid into the container is controlled, to obtain a desired fill rate of the container.

Whilst filling, the surface 34 of the second fluid 29 contacts the first substrate 102. Thus, part of the substrate is immersed in the second fluid. Consequently, the surface 34 of the second fluid forms a gutter 42 along the surface 38, in a direction perpendicular to the plane of FIG. 2. The gutter 42 is formed by surface tension forces between the substrate surface 38 and the second fluid 29. The gutter is a depression in the surface 34 of the second fluid caused by interaction of the second fluid with the surface 38 of the first substrate. The curvature of the surface 34 forming the gutter may be determined by the size of the angle α; the configuration of the surface 34 of the second fluid adjacent the gutter, for example if the adjacent surface is flat and lying in the horizontal plane; the composition and properties of the first and second fluids, such as their viscosity and surface tension; the materials forming the surface 38 of the substrate and their wettability, including any changes in wettability or physical shape across the surface; and environmental conditions such as temperature.

The surface 34 of the second fluid may also have a curved profile 46, with a configuration inverse that of the gutter 42, when interacting with the surface 37 opposing the electrode covered surface 38. This is caused by surface tension forces, and such an inverse gutter will be referred to in later described embodiments. The inverse gutter may be considered to have the form of a bank, or a raised portion of the surface of the second fluid.

A quantity of the first fluid 44 is provided in the gutter 42. This quantity of the first fluid floats on the surface 34 of the second fluid as the first fluid is less dense than, and immiscible with, the second fluid. Filling of the container with the second fluid may be paused whilst providing the first fluid in the gutter. The first fluid may be provided using a tube arranged above the gutter. The first fluid spreads along the surface of the gutter of its own accord. The second fluid may not immerse any of the first areas of the substrate when the first fluid is provided; this allows uniform application of the first fluid to the first areas. The quantity of first fluid may be at least sufficient to cover the first areas on the substrate with a layer of the first fluid of a desired thickness. In further embodiments, the quantity of the first fluid may be significantly greater than that required to cover the first areas. In this way, the quantity of first fluid on the surface of the second fluid remains substantially constant whilst applying the first fluid to the first areas, thus applying a uniform layer of the first fluid to the first areas. Substantially constant in these embodiments means the quantity of first fluid for covering the first areas is 10% or less than the total quantity of first fluid on the surface of the second fluid. The quantity required is determined by the number and surface area of first areas. In further embodiments, the quantity of the first fluid on the second fluid may be kept constant, despite applying first fluid to the first areas, by providing further of the first fluid, for example in the gutter, during the method of the invention. Further, the quantity of the first fluid and the configuration of the gutter may be such that the first fluid is substantially confined to the gutter. Substantially confined means the first fluid does not contact a portion of the surface 34 of the second fluid which lies adjacent the gutter and is in the horizontal plane.

The method of the invention includes moving the gutter 42 along the surface 38 of the substrate by providing the second fluid into the container, to coat the first areas with a layer of the first fluid. The gutter is moved in this embodiment by continuing to fill the container with the second fluid. Filling the container causes the surface 34 of the second fluid to rise, in turn raising the gutter and moving the gutter in a direction 48 parallel the surface 38 of the substrate. Since the gutter is formed at the surface 38 of the substrate, the gutter remains in contact with the surface 38 as the surface 34 of the second fluid rises. The first fluid adheres to the first areas when contacting the first areas, given their hydrophobic properties. Thus, as the gutter 42 moves along the surface 38, the first fluid 44 in the gutter coats the first areas with a layer 114 of the first fluid. However, the wettability of the second areas may be sufficiently large to expel any first fluid from the surface of the second areas walls during the method of the invention. Thus, no first fluid is deposited on the second areas.

In the present invention, in addition to providing the substrate at the angle α, the increased depth of the gutter allows use of a smaller quantity of first fluid floating on the second fluid in the gutter, while still covering sufficient pixel areas on the substrate to achieve proper filling. For example, in one embodiment, the first fluid in the gutter may cover two pixel areas when moving along the surface. This is not indicated in the Figures. In other embodiments, changing the angle α will cause more or fewer pixel areas to be covered. When the angle α is larger than 170 degrees, the second fluid tends to move irregularly over the surface of the substrate, which may be due to pinning of the interface between the first and second fluid on borders of areas of the substrate having a higher and a lower wettability, such as the first and second areas.

Figure 3:
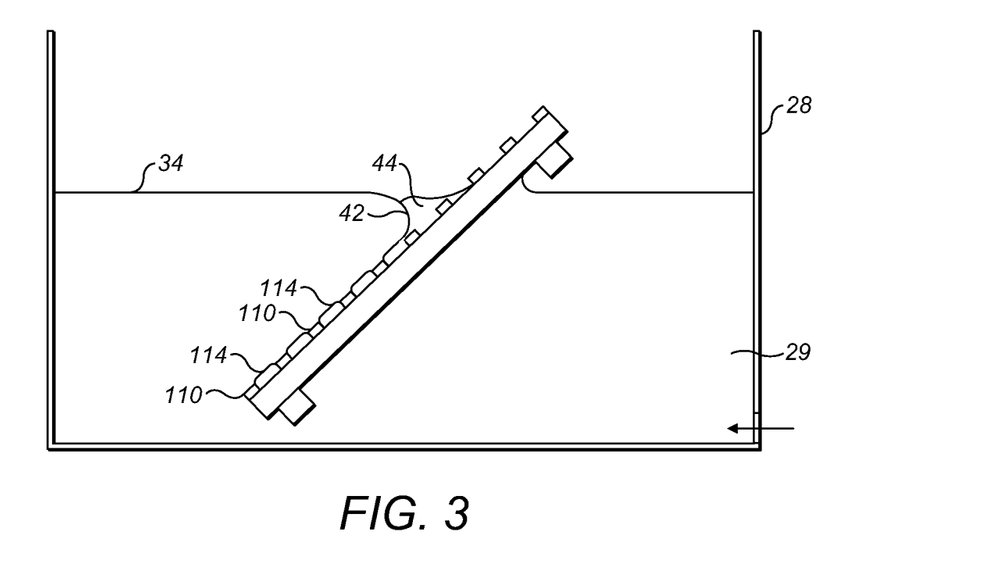

FIG. 3 shows the apparatus at a certain stage of the method of this embodiment of the invention at a later stage from that shown in FIG. 2. By providing more of the second fluid in the container, the surface 34 of the second fluid is higher than in FIG. 1, as is the gutter 44. Consequently, more of the first substrate is immersed in the second fluid, and more of the first areas are covered with the layer 114 of first fluid. The second areas 110 in between the first areas are not coated with the first fluid, given their hydrophilic properties.

Figure 4:
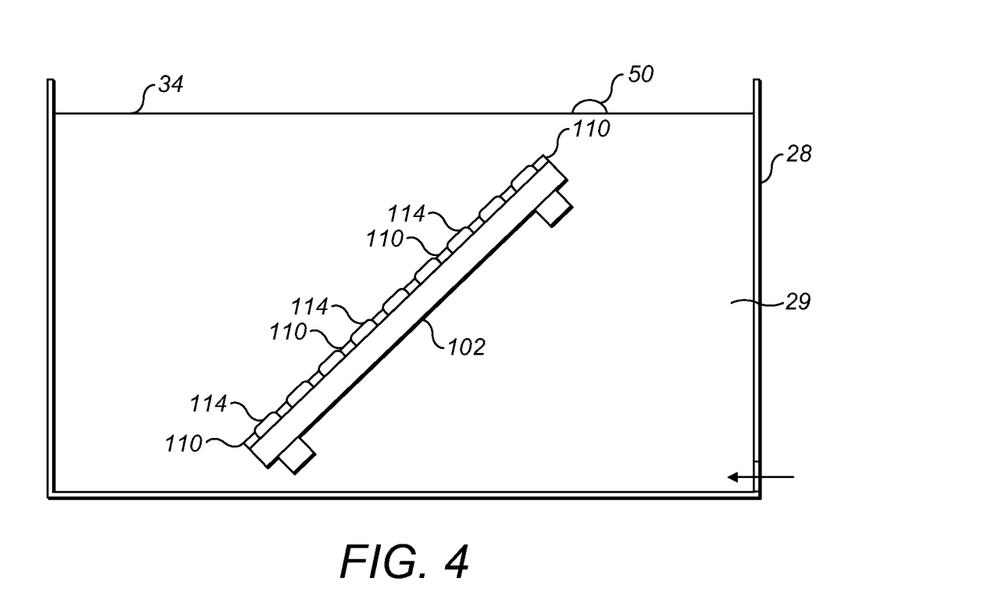

FIG. 4 shows the apparatus at an even later stage of the method of this embodiment, with the container 28 filled with second fluid so that the first substrate 102 is immersed with second fluid. This stage is after the first areas are coated with a layer of the first fluid. Thus the first fluid has been provided on at least part of the substrate. Since the surface 34 of the second fluid is no longer in contact with the first substrate, as in this embodiment the surface 34 is above the uppermost point of the first substrate, there is no longer a gutter. Thus, any excess of the first fluid not applied to the first areas floats on the surface 34 of the second fluid, for example as a globule 50. Alternatively, the excess may form a thin film over the surface of at least part of the second fluid. The excess first fluid may be removed from the surface 34 of the second fluid, perhaps using a scraper or a skimmer. In further embodiments, the first fluid may be removed from the surface of the second fluid using a syringe or suchlike, possibly from the gutter whilst the gutter is still present. The excess first fluid may be removed before removing the coated first substrate from the second fluid, to avoid the excess contacting the first fluid layer on the first areas, which may disrupt the thickness of the first fluid layer. Alternatively, a separator (not indicated) may be inserted through the surface 34 of the second fluid, so that the excess first fluid is restrained to one side of the separator, and the coated first substrate may be removed by for example putting the substrate in a water-filled transport container, which is then removed from the container in which the substrate was filled and taken to a station where it is adhered to the second substrate. Alternatively, the coated substrate may be processed in the container, for example on the other side of the separator. Such processing may include applying the second substrate (not indicated) provided with pressure adhering seals, under the surface 34 of the second fluid, to the first substrate covered with the first fluid, to form an electrowetting element described in FIG. 1, with the space surrounding the first fluid layers being filled with the second fluid.

Figure 5:
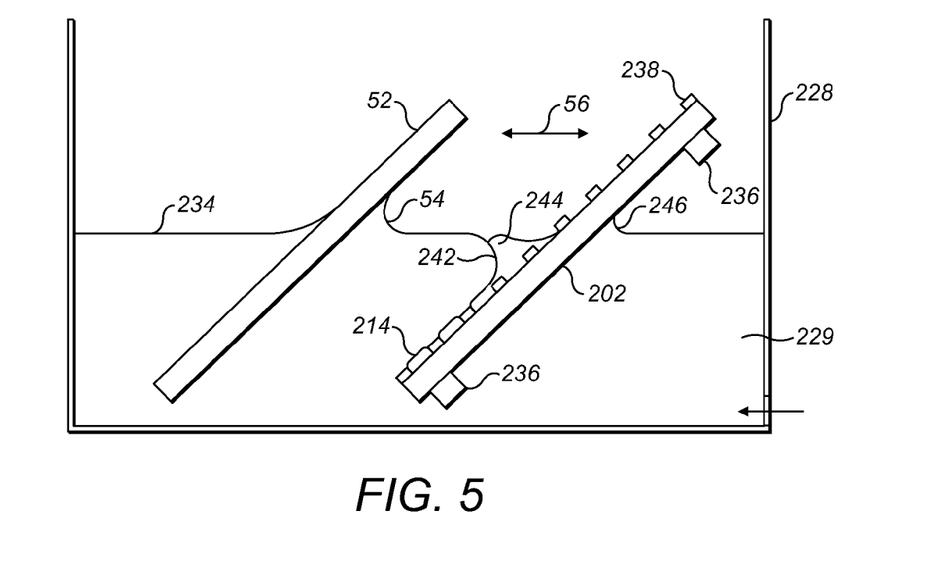
FIGS. 5 and 6 show schematically apparatus for methods according to a different embodiments of the invention.

FIG. 5 shows schematically apparatus for performing an alternative method of the invention. Features described for FIG. 5 and shown in FIG. 5 are similar to features described previously. Such features will be referred to using the same reference numerals, incremented by 200; corresponding descriptions should be taken to apply also.

In this embodiment, a plate 52 is arranged parallel to the surface 238 of the first substrate 202, before moving the gutter along the surface 238 of the first substrate. The plate may be mounted across the container 228 and fixed to opposing walls of the container. In other embodiments, the plate 52 may be arranged at a different angle with respect to the surface 238 of the first substrate. The plate 52 may be adapted so a tube (not indicated) for providing the first fluid in the gutter passes through the plate and opens above the gutter. Alternatively, a tube may be passed between the substrate 302 and the plate 352 for providing the first fluid in the gutter.

The surface 234 of the second fluid interacts with the surface of the plate 52 facing the first substrate 202, thus forming an inverse gutter 54. The spacing between the plate 52 and the first substrate is for example 13 millimetres, taken in the direction indicated by the arrow 56. Depending on the extent of this spacing, the inverse gutter 54 may influence the configuration of the gutter 242, by applying surface tension forces to the gutter 242.

Depending on the surface tensions of the first and second fluids, it is possible that the first fluid may not remain confined in the gutter, but may flow out of the gutter, onto the surface of the second fluid surrounding the gutter. The inverse gutter formed by the plate helps to force the first fluid into the gutter, thus maintaining first fluid in the gutter, to ensure uniform coating of the substrate surface with the first fluid. The inverse gutter may be formed when the angle between the surface of the plate facing the first substrate and the horizontal plane is at 45 degrees. This angle may be less than 45 degrees.

The configuration of the gutter 242 may be influenced by changes in the surface 238 of the first substrate 202 which may provide resistance to the passage of the gutter along the surface 238. For example, a change in wettability of the surface 238 from a hydrophobic to a hydrophilic area, or vice versa, or a physical structure on the surface 238 such as a raised wall for defining a pixel area on the first substrate, may affect the gutter configuration. Thus, as the gutter moves along the surface 238, the gutter may change shape, for example by being deepened when encountering resistance on the surface 238, followed by a shallowing of the gutter upon release of the gutter from the resistance. Such changes to the gutter may lead to part of the first fluid flowing out of the gutter. The inverse gutter 54 may provide resilience against such changes in the gutter configuration and the subsequent flowing out of the first fluid, by pushing the first fluid back into the gutter. Thus, this embodiment may cause a more uniform layer of first fluid to be applied on the first areas.

In further embodiments, the plate 52 may be a further first substrate for coating with the first fluid, or may be arranged to support a further first substrate for coating with the first fluid, in accordance with the method of the invention.

Figure 6:
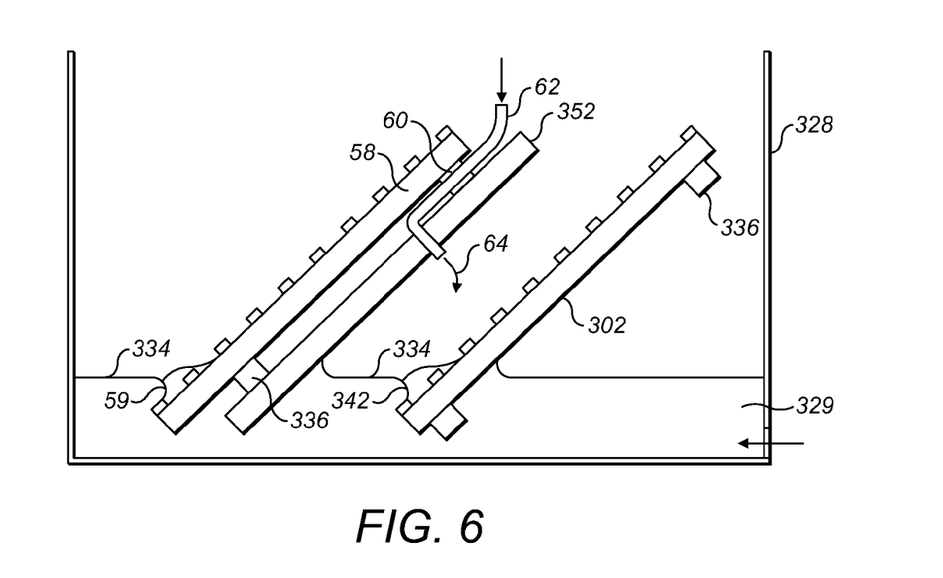

FIG. 6 shows schematically apparatus for performing an alternative method of the invention. Features described for FIG. 6 and shown in FIG. 6 are similar to features described previously. Such features will be referred to using the same reference numerals, incremented by 300; corresponding descriptions should be taken to apply also.

In this embodiment, the plate 352 is mounted to further supports. A further first substrate 58, similar to that described previously, may also be mounted on the further supports, in the manner described for the first substrate 302. In this way, multiple first substrates may be coated with the first fluid simultaneously, using a further gutter 59 in accordance with the method of the invention. One of the further supports, labelled in FIG. 6 as 60, may be adapted so that a tube 62 passes through the further support 60. The plate 352 may also be adapted so the tube 62 passes through a hole in the plate 352, and opens above the gutter 342. The first fluid may be dispensed 64 through this opening, via the tube 62, to provide the first fluid in the gutter 342. In further embodiments, the tube opening may be arranged closer to the gutter than illustrated in FIG. 6, to minimise any splashing of the first fluid when dispensed.

Figure 7:
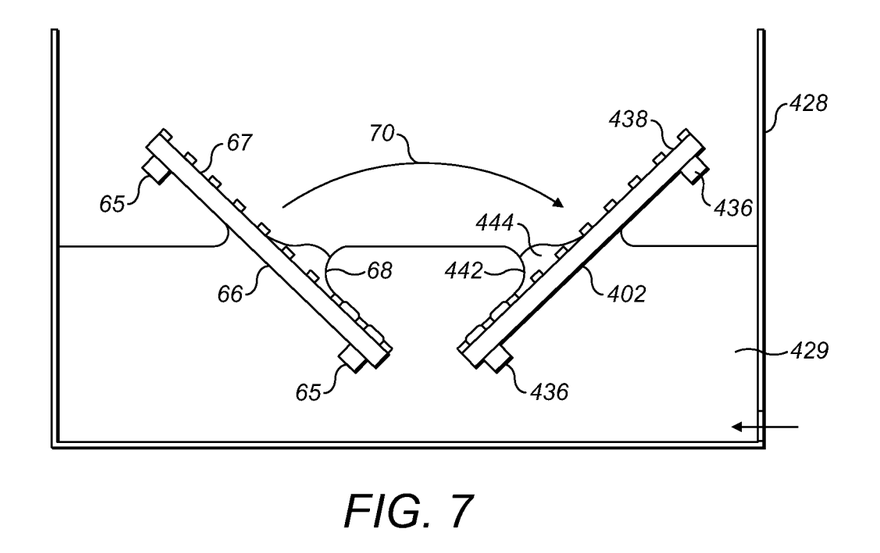
FIGS. 7 and 8 show schematically apparatus for a method of a further embodiment of the invention.

FIG. 7 shows apparatus for an alternative embodiment of the invention. Features described for FIG. 7 and shown in FIG. 7 are similar to features described previously. Such features will be referred to using the same reference numerals, incremented by 400; corresponding descriptions should be taken to apply also.

In this embodiment, the container 428 includes further supports 65 for mounting a further first substrate 66 thereon which are similar to the supports described previously. This allows both of the first substrates 402, 66 to be coated with the first fluid simultaneously. The further supports 65 are arranged so the surface 67 of the further first substrate 66 to be coated with first fluid faces the surface 438 of the first substrate 402. The surfaces 67, 438 may be arranged perpendicular each other, or may be arranged with a different angle with respect to each other, to determine the thickness of the applied first fluid layer. The surface of the second fluid forms a further gutter 68, which is caused by interaction with the surface of the further first substrate. This further gutter 68 is similar to the gutter 442 formed with the first substrate 402 and may be filled with a quantity of a first fluid, and moved along the surface of the further first substrate, in a similar manner as described previously, in order to coat the further first substrate with first fluid. The first fluid provided in the two gutters 442, 68 may be the same fluid, or different fluids, for example being differently coloured. The quantity of first fluid in each gutter may be the same, or may be different. The spacing between the two first substrates may be set to determine the thickness of the first fluid applied to the first substrates.

Figure 8:
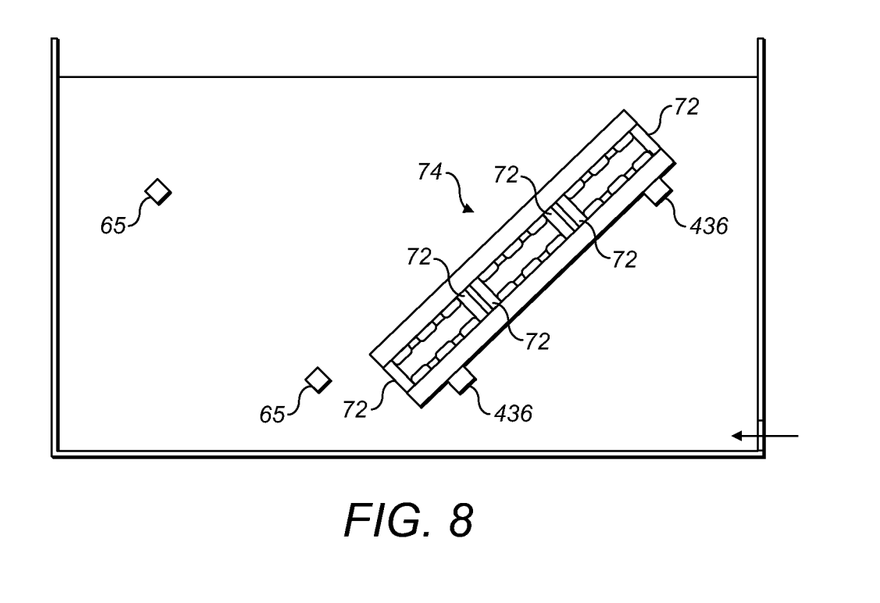

Both first substrates 402, 66 may be coated with the first fluid simultaneously, by filling the container with second fluid, as described previously. Once both substrates are coated and immersed in the second fluid, one of the first substrates, in this example the further first substrate 66, may be moved in the direction indicated by arrow 70 so as to join the two first substrates 66, 402 together to form an electrowetting element. In this embodiment, the further first substrate is similar to the first substrate 402 and replaces the second substrate of the electrowetting element described using FIG. 1. Thus, with reference to FIG. 8, by joining the first substrates together, for example with one of the first substrates provided with pressure activated seals 72 between groups of pixel areas, each group forming the display area of an optical display comprising a plurality of electrowetting elements, an optical display 74 comprising two first fluid layers which are independently switchable may be formed. Analogously, one can add further switchable layers to a display by filling multiple substrates at the same time and combining them after they have been filled. As indicated in FIG. 8, two seals 72 may be provided between adjacent groups of pixel areas, so the substrates may be cut between such seals, thus obtaining individually sealed optical displays.

Figure 9:
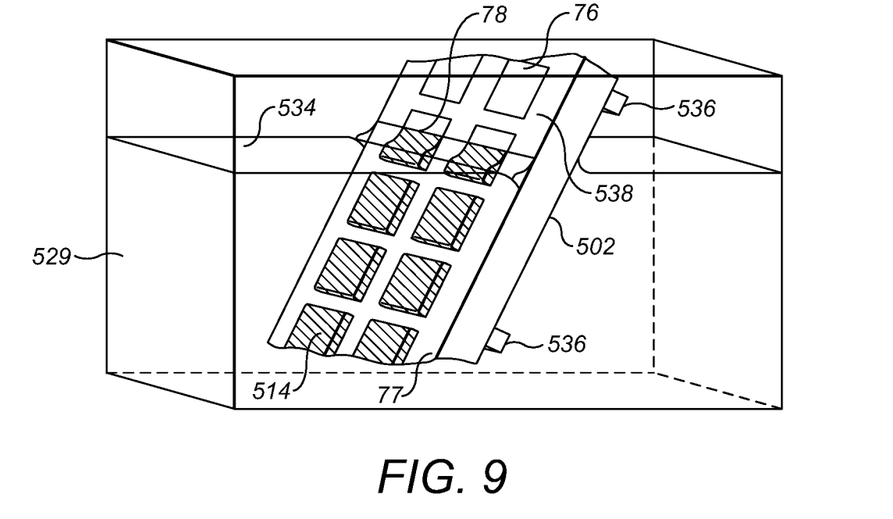
FIG. 9 shows apparatus for an embodiment of the method of the invention.

FIG. 9 shows in perspective the apparatus illustrated in FIG. 3. Features described for FIG. 9 and shown in FIG. 9 are similar to features described previously. Such features will be referred to using the same reference numerals, incremented by 500; corresponding descriptions should be taken to apply also.

Figure 10:
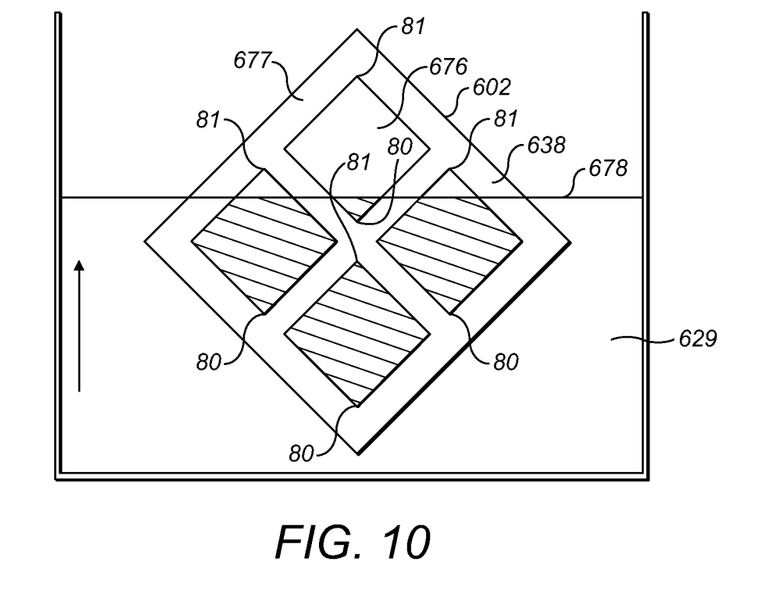
FIG. 10 shows apparatus for an alternative embodiment of the invention.

The hydrophobic first areas 76 and hydrophilic second areas 77 are illustrated in FIG. 9. In FIG. 9, and FIG. 10 to be described below, fewer pixel areas are shown than in previous Figures, for the sake of clarity. Below the surface 534 of the second fluid, the first areas are covered with first fluid layers 514 (indicated with hatching). The first areas are in this embodiment square in shape, and the first substrate 502 is arranged in the container such that two of the edges of the square first areas are horizontal and the other two edges are vertical. As the gutter moves along the surface 538 of the first substrate, a line 78 of the first fluid contacting the surface 538 moves along the surface 538. As the line 78 passes over changes in the surface 538, for example areas with a different wettability from other areas along the line 78, such as the first and second areas 76, 77, the moving of the gutter may feel more resistance in certain areas of the surface compared with other areas. Such resistance, and the detrimental consequent sudden release effects have been described above.

FIG. 10 shows parts of apparatus in a further embodiment of the invention. Features described for FIG. 10 and shown in FIG. 10 are similar to features described previously. Such features will be referred to using the same reference numerals, incremented by 600; corresponding descriptions should be taken to apply also.

In this embodiment, the first substrate 602 is mounted in the same plane as the first substrate 102 is mounted as shown in FIG. 2. However, referring to FIG. 2, in this embodiment the first substrate is rotated by 45 degrees so that the edges of the square first areas 676 have an angle with the line 678 of the first fluid of 45 degrees. Consequently, each square first area 676 has a corner 80 as the first point the first fluid moving along the surface 638 contacts. With the substrate arranged with this orientation, the resistance felt by the gutter moving along the surface 638, and therefore the sudden release effects, are reduced. Also on the top side of the first areas, as indicated by the upper corners 81, the sudden release effect due to the transition of the first fluid from a less wettable area to the more wettable area is strongly reduced in this embodiment. Thus, a more uniform layer of the first fluid may be obtained.

The above embodiments are to be understood as illustrative examples of the invention. Further embodiments of the invention are envisaged. For example, embodiments described for applying the first fluid to two substrates may be used to apply the first fluid to more than two substrates simultaneously.

The order of steps in the method described above may be performed in a different order. For example, the steps of immersing the substrate in a second fluid and providing a quantity of the first fluid may be interchanged, such that the first fluid is provided on the surface of the second fluid and subsequently the substrate is immersed in the fluids, thereby forming the gutter. The quantity of first fluid is therefore provided in the gutter by first fluid floating on the second fluid that flows into the gutter.

Further, the Figures are not drawn to scale and are schematic; illustrated features may have been drawn proportionally larger for clarity purposes. For example, the substrates illustrated in cross section show nine hydrophobic pixel areas. For the sake of clarity, FIGS. 9 and 10 show fewer pixel areas than in FIGS. 1 to 8. The method of the invention may be applied to substrates with any number of hydrophobic first, pixel, areas, and indeed to substrates with any pattern of hydrophobic first and hydrophilic second areas. For example, each substrate may comprise a plurality of groups of pixel areas, each group of pixel areas forming the display area of an optical display. Thus, each substrate may be used to manufacture a plurality of optical displays with each run of the method of the invention.

As illustrated, the quantity of the first fluid in the gutter may be sufficient to cover at least one pixel area, or at least two or even more pixel areas, simultaneously, when moving the gutter along the surface. Alternative embodiments are envisaged which may use different fluids, different substrates, and different apparatus for positioning the substrates and performing the invention, from those described.

According to a further aspect of the invention, there is provided a method of providing a first fluid on a surface of a substrate for manufacturing an electrowetting device, the method including the steps of providing at least part of the substrate in a container for holding a quantity of a second fluid, the second fluid being immiscible with the first fluid;

providing the second fluid into the container;

providing a quantity of the first fluid on the second fluid and adjacent a surface of the substrate;

providing further of the second fluid into the container, thereby moving the quantity of first fluid along a surface of the substrate.

This method may be performed using the apparatus described above. This method may be applied with the first substrate being positioned in the container with an angle α of less than 100 degrees, and between 90 degrees and 170 degrees. This method avoids moving the substrate into the fluids in the container, or moving a container already filled with fluids to surround the substrate; such methods cause mechanical vibrations which may affect the homogeneity of a layer of first fluid provided on the substrate surface. The second fluid may be provided in the container at a base of the container, or at least below the substrate mounted in the container, to reduce vibrations to an upper surface of the second fluid.

In further embodiments it is envisaged that a further fluid, different from the first and second fluids, and for example a liquid, may be applied to form a covering layer over the surface of the first and second fluids in the container exposed to the atmosphere. The further fluid would prevent evaporation of the first and second fluids, and may also reduce contamination of the first and second fluids, for example caused by drying out of the first fluid. The further fluid would be immiscible with the first and second fluids and have a suitable viscosity and surface tension to cover the first and second fluids. The further fluid may for example be a fluorocarbon liquid.

It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims.

What is claimed is:

1. A method of using a first fluid and a second fluid for providing the first fluid on a surface of a substrate for manufacturing an electrowetting device, the method including:
   immersing part of the substrate in the second fluid, the surface of the substrate having at least one first area with a greater wettability for the first fluid than for the second fluid, the second fluid being immiscible with the first fluid, and a surface of the second fluid adjoining the surface of the substrate to form a gutter along the surface of the substrate;
   providing a quantity of the first fluid in the gutter; and
   moving the gutter along the surface of the substrate, the surface of the substrate and a horizontal plane forming an angle between 100 degrees and 170 degrees.

2. A method according to claim 1, wherein the first fluid floats on the second fluid and is substantially confined to the gutter.

3. A method according to claim 1, including:
   arranging the substrate in a container; and
   providing the second fluid into the container, thereby moving the gutter along the surface of the substrate.

4. A method according to claim 1, including arranging a plate parallel to the substrate before moving the gutter along the surface of the substrate.

5. A method according to claim 4, wherein the angle between the surface of the substrate and the horizontal plane is between 135 degrees and 160 degrees.

6. A method according to claim 4, wherein the plate is a further substrate or a support plate for a substrate.

7. A method according to claim 4, wherein the first fluid is provided in the gutter through a hole in the plate or through a tube passing between the substrate and the plate.

8. A method according to claim 1, including:
   removing the first fluid from the surface of the second fluid after the first fluid has been provided on the surface of at least part of the substrate; and
   removing the substrate from the second fluid.

9. A method according to claim 3, wherein the providing of the second fluid into the container moves the gutter so as to immerse further of the substrate in the second fluid.

10. A method according to claim 1, including providing a further fluid, immiscible with the first and second fluids, which covers a surface of the first and/or the second fluids.

11. A method of providing a first fluid on a surface of a substrate for manufacturing an electrowetting device, the method including:
   providing at least part of the substrate in a container for holding a quantity of a second fluid, the second fluid being immiscible with the first fluid;
   providing the second fluid into the container;
   providing a quantity of the first fluid on the second fluid and adjacent a surface of the substrate;
   providing further of the second fluid into the container, thereby moving the quantity of first fluid along a surface of the substrate.

12. A method according to claim 1, wherein the gutter comprises a depression in the surface of the second fluid, adjacent the substrate.

13. A method according to claim 1, wherein a surface of the second fluid, different from the surface forming the gutter, defines the horizontal plane.

14. A method according to claim 1, wherein the surface of the substrate comprises a pattern including the at least one first area and at least one second area with a greater wettability for the second fluid than for the first fluid.

15. A method according to claim 14, wherein the at least one first area comprises a plurality of first areas separated by at least one of said at least one second area.

16. A method according to claim 15, wherein each said first area is a pixel area for an electrowetting display device and each said at least one second area forms at least one inter-pixel wall.

17. A method according to claim 1, wherein the substrate has a further surface substantially parallel to said surface of the substrate along which the gutter is formed, wherein during said method there is an absence of first fluid in contact with the further surface.

18. A method according to claim 1, wherein during said moving the gutter along the surface of the substrate, second fluid is moved along a further surface of the substrate without providing first fluid on the further surface, the further surface being substantially parallel to said surface of the substrate on which the first fluid is provided.

19. A method according to claim 1, wherein the substrate has a further surface substantially parallel to said surface of the substrate along which the gutter is formed, wherein the further surface has a greater wettability for the second fluid than for the first fluid.

20. A method according to claim 1, wherein the substrate has a further surface substantially parallel to said surface of the substrate along which the gutter is formed, wherein the second fluid adjoins the further surface to form an inverse gutter along the further surface.

21. A method according to claim 1, wherein said providing the quantity of the first fluid in the gutter is performed after said immersing part of the substrate in the second fluid.

22. A method according to claim 2, wherein, with the second fluid being substantially confined to the gutter, there is a part of the second fluid without first fluid floating thereon.

* * * * *